United States Patent
Isoz et al.

(10) Patent No.: US 7,844,183 B2
(45) Date of Patent: Nov. 30, 2010

(54) SYSTEM AND A METHOD FOR TRANSMISSION OF INFORMATION

(75) Inventors: Peter Isoz, Huskvarna (SE); Alf Axerud, Huskvarna (SE)

(73) Assignee: SAAB AB, Linköping (SE)

( * ) Notice: Subject to any disclaimer, the term of this patent is extended or adjusted under 35 U.S.C. 154(b) by 889 days.

(21) Appl. No.: 11/425,717

(22) Filed: Jun. 22, 2006

(65) Prior Publication Data
US 2010/0261145 A1 Oct. 14, 2010

(30) Foreign Application Priority Data
Jun. 22, 2005 (EP) ................... 05105549

(51) Int. Cl.
H04B 14/02 (2006.01)
H04B 7/26 (2006.01)
H04W 56/00 (2009.01)
H04L 9/12 (2006.01)

(52) U.S. Cl. ........... 398/131; 398/122; 398/124; 398/125; 398/123; 398/129; 434/11; 434/22; 434/154; 434/156

(58) Field of Classification Search ......... 398/118–131, 398/121, 124, 125; 434/22
See application file for complete search history.

(56) References Cited

U.S. PATENT DOCUMENTS

| | | | | | |
|---|---|---|---|---|---|
| 3,484,167 | A | * | 12/1969 | Burns, Jr. .............. | 356/5.08 |
| 3,633,158 | A | * | 1/1972 | Heibel .................. | 398/170 |
| 3,697,941 | A | * | 10/1972 | Christ .................... | 340/991 |
| 4,091,412 | A | * | 5/1978 | Salonimer ............. | 348/114 |
| 4,218,834 | A | * | 8/1980 | Robertsson ............ | 434/21 |
| 4,232,609 | A | * | 11/1980 | Held ..................... | 102/214 |
| 4,478,581 | A | * | 10/1984 | Goda .................... | 434/22 |
| 4,487,583 | A | * | 12/1984 | Brucker et al. ........ | 434/22 |
| 4,561,849 | A | * | 12/1985 | Eichweber ............. | 434/22 |
| 4,577,962 | A | * | 3/1986 | de Guillenschmidt et al. ..................... | 356/5.05 |
| 4,695,058 | A | * | 9/1987 | Carter et al. .......... | 463/5 |
| 4,770,526 | A | * | 9/1988 | Manhart et al. ....... | 356/5.07 |
| 4,781,593 | A | * | 11/1988 | Birge et al. ........... | 434/22 |
| 4,882,770 | A | * | 11/1989 | Miyahira et al. ...... | 398/76 |
| 5,026,156 | A | * | 6/1991 | Bayston et al. ........ | 356/5.01 |
| 5,056,736 | A | * | 10/1991 | Barton .................. | 244/3.13 |
| 5,068,916 | A | * | 11/1991 | Harrison et al. ...... | 455/39 |

(Continued)

FOREIGN PATENT DOCUMENTS

DE 4218834 A1 * 12/1993

(Continued)

*Primary Examiner*—Ken N Vanderpuye
*Assistant Examiner*—Danny W Leung
(74) *Attorney, Agent, or Firm*—Venable LLP; Eric J. Franklin

(57) ABSTRACT

A system for transmission of information between at least two players in a training area comprises means on a first (1) of said players for encoding light pulses and means for transmitting information in the form of such coded light pulses towards at least one second (2-4) of said players, said second player having means for receiving said light pulses and means for decoding the information thereof. Each of said players is provided with a clock, and the system comprises means for keeping said clocks synchronized. The encoding means and the decoding means are adapted to utilize data of times of transmission and receipt of said light pulses for transmitting information from the first player to the second player.

20 Claims, 2 Drawing Sheets

U.S. PATENT DOCUMENTS

| | | | | |
|---|---|---|---|---|
| 5,087,982 | A * | 2/1992 | Smothers | 398/118 |
| 5,179,559 | A * | 1/1993 | Crisler et al. | 370/332 |
| 5,182,543 | A * | 1/1993 | Siegel et al. | 340/531 |
| 5,297,144 | A * | 3/1994 | Gilbert et al. | 370/346 |
| 5,343,287 | A * | 8/1994 | Wilkins | 356/141.3 |
| 5,382,958 | A * | 1/1995 | FitzGerald | 342/386 |
| 5,416,808 | A * | 5/1995 | Witsaman et al. | 375/356 |
| 5,515,035 | A * | 5/1996 | Gut | 370/445 |
| 5,640,390 | A * | 6/1997 | Sakamoto et al. | 370/346 |
| 5,652,750 | A * | 7/1997 | Dent et al. | 370/326 |
| 5,684,871 | A * | 11/1997 | Devon et al. | 375/239 |
| 5,788,500 | A * | 8/1998 | Gerber | 434/22 |
| 5,904,621 | A * | 5/1999 | Small et al. | 463/52 |
| 5,995,253 | A * | 11/1999 | Flaherty | 398/36 |
| 6,031,601 | A * | 2/2000 | McCusker et al. | 356/5.01 |
| 6,057,949 | A * | 5/2000 | Kinstler | 398/154 |
| 6,215,732 | B1 * | 4/2001 | Nugent | 367/134 |
| 6,386,879 | B1 * | 5/2002 | Varshneya et al. | 434/16 |
| 6,392,692 | B1 * | 5/2002 | Monroe | 348/143 |
| 6,449,485 | B1 * | 9/2002 | Anzil | 455/456.1 |
| 6,549,872 | B2 * | 4/2003 | Bollweg et al. | 702/158 |
| 6,587,187 | B2 * | 7/2003 | Watanabe et al. | 356/5.01 |
| 6,821,124 | B2 * | 11/2004 | Healy et al. | 434/22 |
| 6,922,531 | B2 * | 7/2005 | Smeulders | 398/25 |
| 7,203,424 | B2 * | 4/2007 | Alwan et al. | 398/120 |
| 7,330,661 | B1 * | 2/2008 | Jackson et al. | 398/118 |
| 7,391,975 | B2 * | 6/2008 | Oettinger et al. | 398/129 |
| 7,509,514 | B2 * | 3/2009 | Courant et al. | 713/400 |
| 2002/0093639 | A1 * | 7/2002 | Haga | 356/4.01 |
| 2002/0114045 | A1 * | 8/2002 | Doucet et al. | 359/172 |
| 2004/0012524 | A1 * | 1/2004 | Couronne et al. | 342/387 |
| 2004/0029080 | A1 * | 2/2004 | Healy et al. | 434/19 |
| 2004/0073916 | A1 * | 4/2004 | Petrovic et al. | 725/18 |
| 2004/0085526 | A1 * | 5/2004 | Gogolla et al. | 356/4.01 |
| 2005/0020279 | A1 * | 1/2005 | Markhovsky et al. | 455/456.1 |
| 2005/0107954 | A1 * | 5/2005 | Nahla | 701/301 |
| 2006/0240393 | A1 * | 10/2006 | Reeves et al. | 434/236 |
| 2007/0261076 | A1 * | 11/2007 | Puputti | 725/25 |
| 2008/0131134 | A1 * | 6/2008 | Dreischer et al. | 398/128 |
| 2008/0233543 | A1 * | 9/2008 | Guissin | 434/19 |
| 2008/0285977 | A1 * | 11/2008 | Caplan | 398/130 |

FOREIGN PATENT DOCUMENTS

WO 199113319 A 9/1991

* cited by examiner

SYSTEM AND A METHOD FOR TRANSMISSION OF INFORMATION

TECHNICAL FIELD OF THE INVENTION

The present invention relates to a system for transmission of information between at least two players, such as tanks, personnel etc., in a training area. In particular, the invention relates to a system comprising means arranged on a first of said players for encoding light pulses and means for transmitting information in the form of such coded light pulses towards at least one second of said players, said second player having means for receiving said light pulses and means for decoding the information thereof, as well as a method of transmission of information.

BACKGROUND OF THE INVENTION

It is pointed out that the term "light" in the expression "light pulses" used in the description herein does not only mean visible light but also include light in a wider spectra, as for instance light and certainly also infrared light, but is hereafter only referred to as "light pulses".

Such a system and method may be used for transmitting all types of information, such as fired ammunition type or other parameters relating to the condition of said first player, but for illustrating the present invention and the problem to be solved thereby such transmission for determining scoring of simulated firing of said first player, i.e. whether a projectile fired by the first player has hit a said second player or not, will hereinafter be described in a non-limitative way.

Although the specification herein refers to first and second players it is pointed out that both players may have the same equipment and may be regarded as first and second players, and there may be many such similar players participating in said training area.

When a said first player is shooting towards a said second player, which may be a tank, another vehicle, a soldier, a building, etc. at a relevant distance, it may be necessary to consider the ballistics of the projectile or the missile trajectory when determining the location of the hit point with respect to said second player. However, said light pulses are traveling in a rectilinear path, so that it is not possible to decide where the hit point is located with respect to said second player when only the recti-linear characteristics of said light pulses are used by said players for determining the hit point. For instance for a tank it is necessary to at least know the aiming direction of the gun relative to said second player, the projectile path characteristics as well as the distance between said players when determining whether the hit point is located on a said second player or not.

U.S. Pat. No. 4,218,834 describes a military training system for scoring a simulated weapon firing, and this system has reflectors arranged on possible targets, such as said second players, for reflecting said light pulses back to said first player, which may then use the travelling time of said light pulses for calculating the distance between the first player and a second said player. However, such reflectors put on possible said second players are somewhat costly.

The simplest form of simulation is to only transmit a pulse coded rectilinear light beam and when said second player detects these pulses they may be evaluated as a hit. There is not any ballistic flight path considered and a simple form of hit position determination may only be done by having a number of detectors on said second players, in some weaponry training areas there may simultaneously be players with ballistic and rectilinear simulator equipment. The latter are usually personnel because of several reasons like the requirement for lower weight, less power consumption and lower cost.

U.S. Pat. No. 6,386,879 describes another system and method of this type having no reflectors. The distance between said first and second players is determined by comparing the players GPS positions. This information together with ammunition type and other data is transmitted instantly at time of fire and then said second player computes an impact position and effect on target. This requires that said second player knows GPS data and other player data of said first player which significantly increases the number of light pulses, that has to be transmitted by said first player and correctly received by the second player.

The type of simulation defined in U.S. Pat. No. 4,218,834 is usually applied as a real time type of simulation as the sweeping fan shaped beams usually follows the simulated flying projectile during its time of flight and finally when the said first player receives reflections from a said second player at the same distance as the simulated projectile, the data is transmitted.

The said rectilinear path type of simulation on the other hand usually makes an instant transfer of data at time of fire to the said second player. Both real time type and instant type of simulator systems require more or less data to be transferred to the said second players. There are many parameters that are influencing light pulse transmission concepts for sending information between said players to be as error free as possible and some examples are given here. The transmitter intensity and transmission duration are limited because of safety regulation limits. There are several reasons why the transmission of information may be disturbed. For instance the atmospheric influence may fluctuate from for instance weather conditions, strong sunshine may influence the said light pulse detector sensitivity and sometimes there are thermal air turbulences reducing the number of received aid light pulses in a transmission. The total available error free time to transmit may be very short especially if the transmitter has not a stable direction during the data transmission. This makes it necessary to keep the number of said light pulses in light pulse transmission protocols to a minimum, still being able to transmit with enough redundancy that losses of said light pulses does not cause any data loss. The method of this invention provides a previously unknown possibility to use a minimum required light pulses to be transmitted.

SUMMARY OF THE INVENTION

The object of the present invention is to provide a system and a method for trans-mission of information used in the type of application defined in the introduction, which in at least some aspect improve such applications already known.

This object is according to the invention obtained by providing such a system with a clock for each said players, means for keeping said clocks synchronized, designing the encoding means to encode the light pulses by controlling the transmission means to transmit light pulses at transmission times with a relation to predetermined reference times known by said first and second players, and designing said decoding means to decode said light pulses by using information about the time of receipt of said light pulses and said predetermined reference times, as well as a method. This system and method may be applied to many different types of training equipment using a variety of types of light pulse transmission protocols.

By providing said players with synchronized clocks it is possible to use the knowledge of speed of light for transmitting information from said first player to said second player.

When for instance said light pulses are transmitted at a reference time also known by said second player the time of receipt of the light pulses and the knowledge of speed of light may be used for calculating the distance between said first player and said second player. By using such synchronized clocks together with said means transmitting said light pulses, information channels are established between said players, and this may be used for many other purposes than for calculating distances between the players. It is in this context pointed out that, "by using information about the reference times and the time of receipt of said light pulses" is to be interpreted broadly, and the information about said distance has not necessarily to be directly calculated, but it may be indirectly considered for the transfer of infororation as will be set forth further below.

According to an embodiment of the invention said transmitting means is adapted to transmit said light pulses at said predetermined reference times, and the system comprises means arranged at said second player for calculating the distance between said second player and said first player by establishing the difference between said time of receipt and a possible said time of transmission equal to a known predetermined reference time and using the knowledge of the speed of light. This constitutes a simple and accurate method for said second player to calculate the distance to said first player.

According to another embodiment of the invention the system comprises a member arranged on said first player and adapted to, during the flight time of a simulated flying projectile fired by the first player, calculate the distance from the first player to the simulated flying projectile, said encoding means is adapted to control said transmitting means to transmit light pulses corresponding to said simulated flying projectile at a time before said predetermined reference time corresponding to the time needed for light to travel from said first player to said simulated flying projectile, and said decoding means is adapted to calculate the distance from said second player to said simulated flying projectile by comparing the time of receipt of said light pulse and said predetermined reference time. The difference between the time of receipt and the predetermined reference time is, by using the knowledge of speed of light, a direct measure of the actual distance between said flying projectile and a said second player. This makes it possible for the second player or second players to for instance decide whether the information sent is in real time intended and/or valid for said second players or not. In for instance combat training situations both said first player and many said second players may frequently and simultaneously move and the decision to receive information by the correct said second players at the right moment is accomplished using this described method where only a said simulated flying projectile close to said second players may engage said second players. This also makes it possible for the said first player to more realistically simulate for instance ammunition having effect at a predefined distance, as for instance simulating time fused ammunition or low velocity ammunition using an elevated ballistic path like grenades.

According to another embodiment of the invention said encoding means is adapted to control said transmitting means to transmit information through light pulses within certain reference time intervals having a given predetermined reference start time and to transmit information by selecting the time distance of the time of trans-mission of light pulses to said reference start time of such an interval. The method used by such a system may be used to inform the second player of the position of a target distance selector of said first player, possibly to be a multiple of for instance 100 meters depending upon the magnitude of said time distance.

The time distance between consecutive possible predetermined reference times of transmission in the system and method according to the invention are selected so that there is no risk for misinterpretation, such as for instance in the interval between 80 μs-160 μs, which corresponds to a light travelling distance between 24-48 km, which is supposed to be more than the longest possible distance to engage players participating in a said training area.

According to another embodiment of the invention said encoding means is adapted to control said transmitting means to transmit said light pulses during intervals having predetermined reference start times known by said first and second players, in which a said interval is built up by at least two, a first and a second, predetermined reference times, the transmitting means is adapted to transmit first and second light pulses at these predetermined reference times and said encoding means is adapted to select the time distance between said first and second light pulses as a carrier of information about for instance type of ammunition fired as a simulated flying projectile by said first player. This constitutes another convenient way of transmitting information between a first player and one or more second players.

According to another embodiment of the invention constituting a further development of the embodiment just mentioned each said interval has a further third predetermined reference time located between said first and second predetermined reference times, said encoding means is adapted to control the transmitting means to transmit a third light pulse at said third predetermined reference time and to use the time distance between the transmission of the third light pulse with respect to that of the first and the second light pulse for transmitting information, such as for instance inform said second player of the position of a target distance selector of said first player. This constitutes a still further possibility to reliably transmit information between a first players and one or more said second players thanks to the synchronized clocks of these players and by comparing pairs of pulse intervals.

According to a still further embodiment of the invention said means for keeping said clocks synchronized are adapted to use a satellite-based navigating system, such as GPS. This may constitute a simple and reliable way to synchronize said clocks, since such GPS-equipment already available today may trig a synchronizing output signal with an accuracy better than 20 ns, which would correspond to a light travel distance of 6 meters, which is well acceptable. Said synchronization may then take place at predetermined time intervals.

According to another embodiment of the invention said transmitting means comprises a laser adapted to emit laser pulses. Infrared laser is a type of light source for many reasons often preferred in systems for training.

According to another embodiment of the invention said first player is provided with the aforesaid members and features of said second player and vice versa. This means that both players have the same possibility to transmit information in said training area. However, it is pointed out that not all players in said training area have to have the same equipment.

The features and advantages of the embodiments of the method according to the invention appear clearly from the above discussion of the system according to the present invention.

The invention also comprises a computer program containing computer program code means for making a computer or processor carry out the steps of the method according to the present invention as well as a computer readable medium having a computer program recorder thereon adapted to make a computer or processor carry out the steps of the method according to the invention. The method according to the present invention may well be controlled by a computer program.

Further advantages as well as advantageous features of the invention will appear from the following description.

BRIEF DESCRIPTION OF THE DRAWINGS

With reference to the appended drawings, below follows a specific description of embodiments of the present invention cited as examples. In the drawings.

DETAILED DESCRIPTION OF EMBODIMENTS OF THE INVENTION

Figure 1:
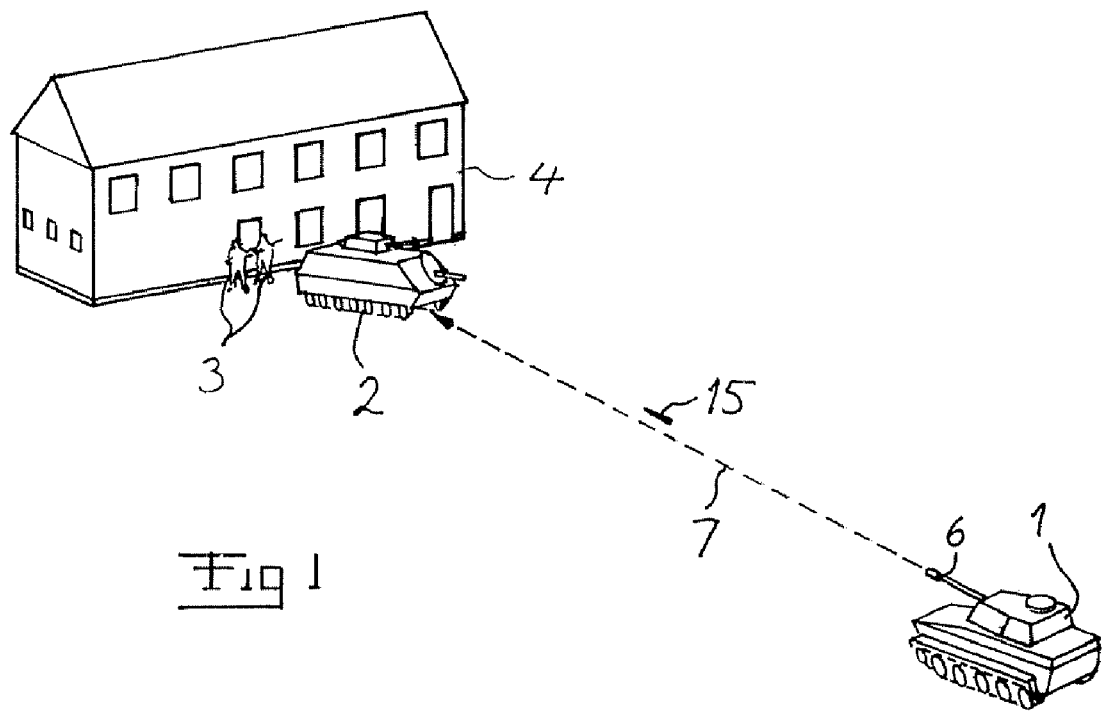
FIG. 1 is a very schematic view illustrating a training area where a first player is a tank engaging second players, which are in this case another tank, personnel and a building, in which a system and a method for trans-mission of information according to embodiments of the present invention may be used.
Figure 2:
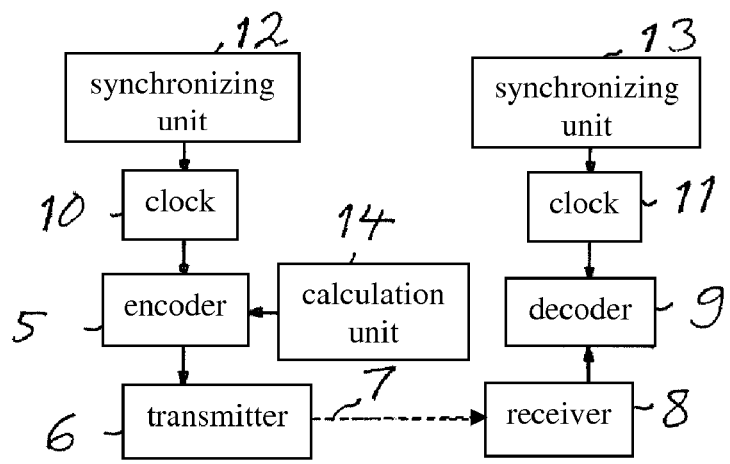
FIG. 2 is a schematic diagram illustrating an example of the members that may be part of a system according to the present invention for transmitting and receiving information between players in a training area as illustrated in FIG. 1.

A system and a method for transmission of information between at least two players, such as tanks 1, 2, personnel 3 and a building 4, etc., in a training area, will now be described while simultaneously referring to all the Figures. Although it is described below how these two players have different type of equipment the first player 1 may have all the equipment of the second players 2-4 and conversely.

The system and method according to the invention may be applied to many different types of training equipment using many types of light pulse transmission protocols.

The first player is provided with means 5 for encoding light pulses and means 6 in the form of a laser for transmitting information in the form of such coded light pulses towards said second player as indicated by the dashed line 7. The second player is provided with means 8 for receiving said light pulses and means 9 for decoding the information thereof.

Each player is provided with an internal clock 10, 11 and means 12, 13 for synchronizing the clocks in the form of GPS-satellite receivers so as to synchronize the clocks with a high accuracy and adapted to do this at frequent time intervals. It is pointed out that different satellites or other equipment may be used for synchronizing said clocks as long as they may be synchronized with an accuracy advantageously better than 0.1 µs, preferably better than 20 ns, corresponding to a light travel distance of 6 meters. Depending on how the method according to the invention is applied and which performances it will support, the synchronization accuracy specification may be selected accordingly.

Said first player is also provided with a member 14 adapted to, during the fly time of a simulated flying projectile 15 (see FIG. 1) fired by the first player, calculate the distance from said first player 1 to the simulated flying projectile 15. The encoding means 5 is adapted to calculate the time needed for light to travel said distance and it may use this calculated time to control the transmission of the transmitting means 6. FIGS. 3-7 are all schematic time graphs having an upper time axis associated with the said first player and a lower time axis associated with a said second player. They are all schematic time graphs illustrating the principles of operation for transmission of information between said first player and said second player according to the invention. The time graphs illustrate only three or four predetermined reference times. Having valid predetermined reference times at intervals between as an example 80-160 µs, gives a number of 6250-12500 predefined reference times per second.

Figure 3:
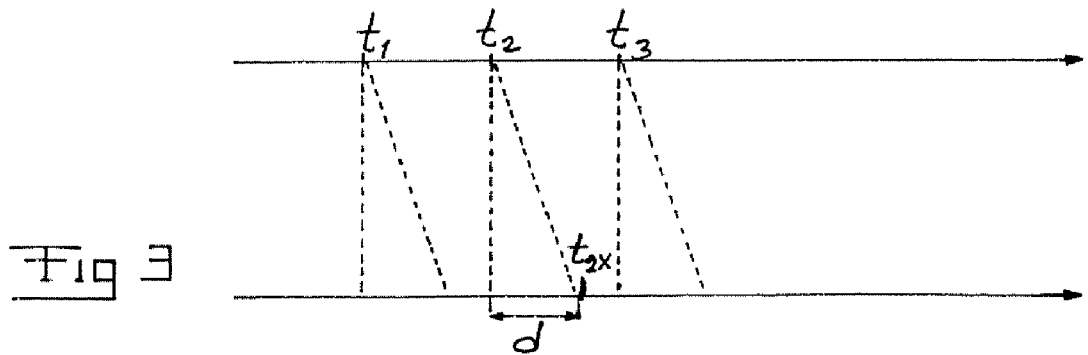
FIG. 3 is a schematic time graph illustrating the principle of operation for a said player to calculate the distance to said first player.

FIG. 3 illustrates how the distance between said first player and a said second player 2-4 may be calculated by controlling said transmitting means 6 to transmit said light pulses at predetermined reference time $t_n$, in which n is an integer. The decoding means 9 of the second player is adapted to calculate the distance between said first player and the second player by establishing the difference d between the time of receipt $t_{2x}$ and a possible said time of transmission $t_2$ equal to a known predetermined reference time and the knowledge of speed of light.

Figure 4:
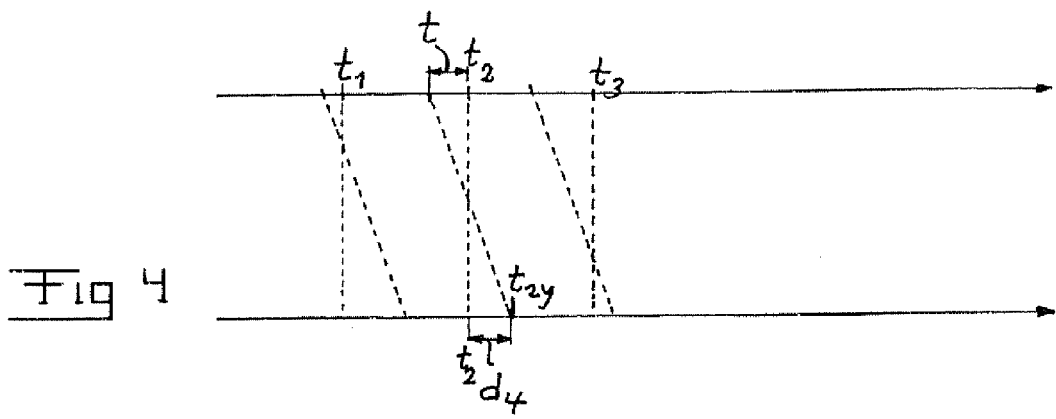
FIG. 4 is a schematic time graph illustrating the principle of operation for a said second player to calculate the distance to a simulated flying projectile fired by a said first player.

FIG. 4 illustrates a method according to the present invention to calculate the distance between a said second player 2-4 and a said simulated flying projectile 15 by using the member 14 adapted to, during the projectile flight time, calculate the distance from the first player to the simulated flying projectile, in which said encoding means 5 is adapted to control said transmitting means 6 to transmit light pulses corresponding to the time t for light to travel from said first player to said simulated flying projectile. The decoding means 9 is adapted to calculate the distance from said second player to said simulated flying projectile by comparing the time of receipt $t_{2y}$ of said light pulse and said predetermined reference time $t_2$. Accordingly, the distance $d_4 = t_{2y} - t_2$ is then multiplied with the speed of light $3 \times 10^8$ m/s for determining the distance between the second player and said simulated flying projectile. This makes it possible for said second players 2-4 to for instance decide whether the information sent is in real time intended and/or valid for said second players or not. In for instance combat training situation both said first player and many said second players may frequently and simultaneously move and the decision to receive information by the correct said second players at the right moment is accomplished by using this method, in which only a said simulated flying projectile close to a said second player may engage said second player. This makes it also possible for said first player to more realistically simulate for instance ammunition having effect at a predefined distance, as for instance simulating time fused ammunition or low velocity ammunition using an elevated ballistic path like grenades.

The time distance $t_{n+1} - t_n$ in FIGS. 3 and 4 between consecutive such possible predetermined reference times of transmission are selected so that there is no risk for misinterpretation, such as for instance in the interval between 80 µs-160 µs, which corresponds to a light traveling distance between 24-48 km, which is expected to be more than the longest possible distance to engage players participating in a said training area.

Figure 5:
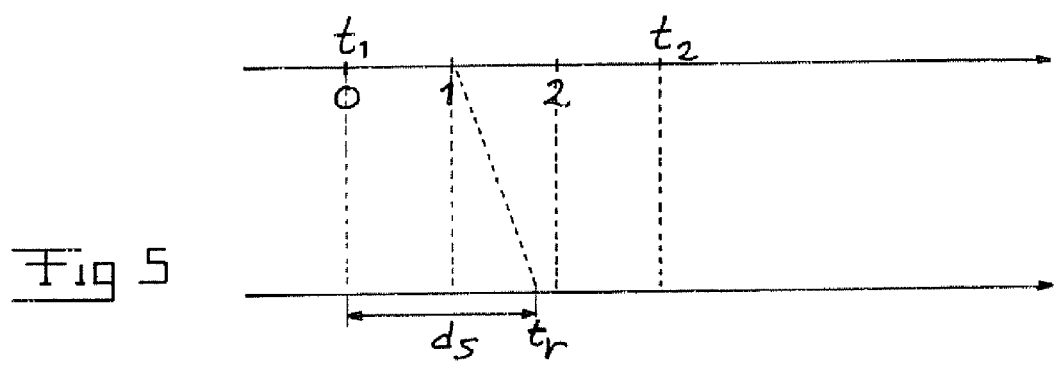
FIG. 5 is a schematic time graph illustrating the principle of operation for a said second player to get information, such as the position of a target distance selector, from a said first player.

FIG. 5 illustrates a method according to the present invention to send information in the form of for instance a value between a said first player and a said second player, in which said encoding means 5 is adapted to control said transmitting means 6 to transmit information through light pulses within certain reference time intervals having a given predetermined reference start time and to transmit information by selecting the time distance of the time of transmission of light pulses to said reference start time of such an interval. The intervals $t_2-t_1$ between said start times are substantially longer than the time needed for light to travel the maximum distance between said two players, such as substantially longer than 80 μs, which corresponds to a distance of 24 km. In such a case said time interval may for instance be 240 μs. The information to be transmitted may then be selected by selecting an integer multiple of 80 μs, by which a transmission of said light pulse is delayed with respect to said interval reference start time $t_1$. This constitutes a simple and accurate method for the second player to decode a value sent from said first player. In the example shown in FIG. 5 the second player will decode the position of the target distance selector from the first player as being 0.100 or 200 meters by multiplying 100 to 0.1 or 2. In this case the time of receipt $t_r$ indicates through the time distance $d_5$ that the light pulse has been transmitted 80 μs after the reference start time $t_1$ giving an information value of 100 meters.

Figure 6:
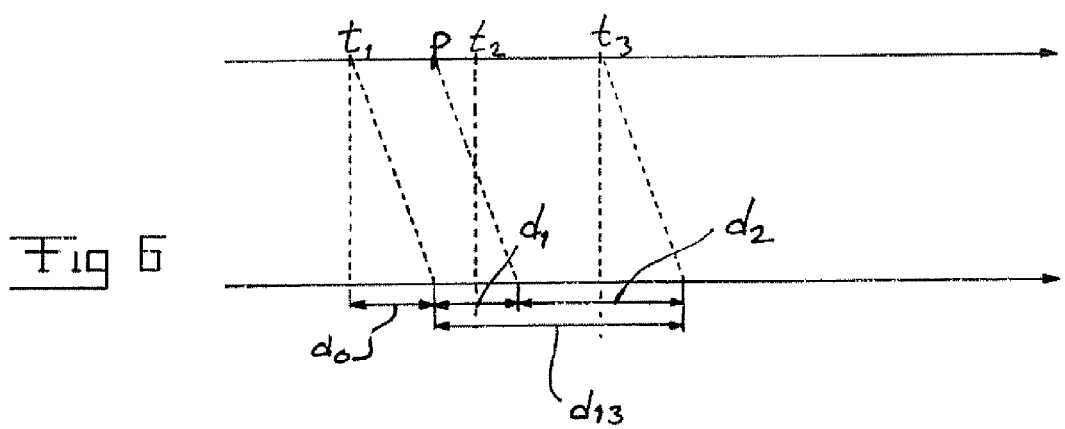
FIG. 6 is a schematic time graph illustrating another principle of operation for a said second player to get information, such as the position of a target distance selector, from a said first player and calculate the distance to said first player.

FIG. 6 illustrates a method to calculate the distance between a said second player and a said first player as well as a method to simultaneously send another information between said first player and said second player. Said encoding means 5 is adapted to control the transmitting means 6 of the first player to transmit light pulses during interval pairs having predetermined reference start times $t_{nN}$ known by all players, in which said interval pairs are built up by three predetermined reference times $t_N$, $t_{N+1}$, $t_{N+2}$, and where N in $t_N$ is always an odd integer, where N starts at the value N=1 and where the first and second said light pulses in a pair of interval are sent at predetermined reference times $t_{nN}$, $t_{nN+2}$ and where the time distance $(t_{nN+2}-t_{nN})=d_{13}$ between the first and the second said light pulse may carry information about for instance the type of ammunition fired, and where said light pulse p in the middle may be used for transmitting information, such as for instance inform said second player of the position of the target distance selector of said first player by selecting a time difference $d_2-d_1$ between the first and the second interval. This constitutes a simple and accurate method for the second player to decode information as fired ammunition type and target distance selector position sent from said first player. At the same time it constitutes a simple and accurate method for the second player to decode said distance to the first player as $d_0 \times 3 \times 10^8$ m/s.

Figure 7:
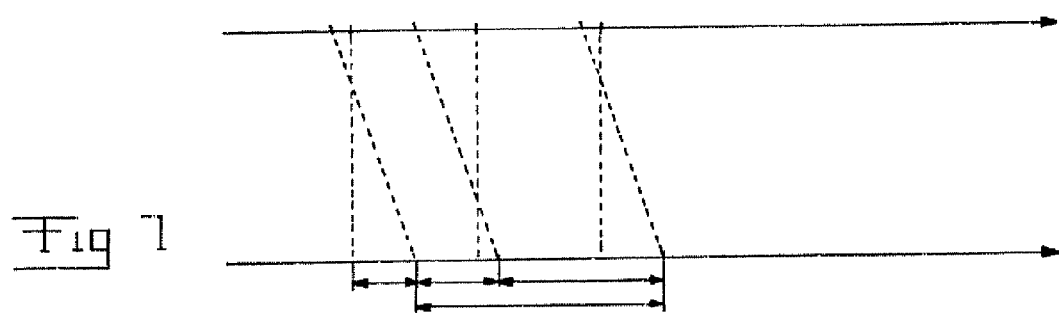
FIG. 7 is a schematic time graph illustrating another principle of operation for a said second player to get information, such as the position of a target distance selector from said first player and calculate the distance to a said simulated flying projectile fired by a said first player.

Finally, FIG. 7 illustrates a method similar to that described with reference to FIG. 6, but in which the possibility to calculate the distance between said second player and said first player is replaced by the possibility to calculate the distance between said second player and said flying projectile by using the calculations of the member 14 to determine when to transmit the first light pulse in the same way as described above with reference to FIG. 4.

The invention is of course not in any way restricted to the preferred embodiments described above, but many possibilities to modifications thereof should be apparent to a person with ordinary skill in the art without departing from the basic idea of the invention as defined in the appended claims.

What is claimed is:

1. A system for transmission of information between at least two players in a training area, said system comprising:
   an encoder arranged on a first of said players and configured to encode light pulses,
   a transmitter arranged on said first player and configured to transmit information in form of the coded light pulses towards at least a second of said players,
   a receiver arranged on said second player and configured to receive said light pulses,
   a decoder arranged on the second player and configured to decode the information in the coded light pulses,
   a clock arranged on each of said players, and
   a synchronizing unit configured to periodically synchronize said clocks,
   wherein the encoder encodes the light pulses by controlling the transmitter to transmit light pulses at transmission times with a relation to predetermined reference times based on the clock at the first player, wherein the first player and the second player know the predetermined reference times, and wherein the decoder is configured to decode said light pulses by using information about a time of receipt of said light pulses and said predetermined reference times based on the clock provided at the second player.

2. The system according to claim 1, wherein said transmitter is configured to transmit said light pulses at said predetermined reference times, and the system further comprising:
   a calculation unit arranged at said second player and configured to calculate the distance between said second player and said first player by establishing the difference between said time of receipt and a possible transmission time equal to a known predetermined reference time and utilizing the speed of light.

3. The system according to claim 1, further comprising:
   a member arranged on said first player and configured to, during a flight time of a simulated flying projectile fired by the first player, calculate the distance from the first player to the simulated flying projectile, wherein said encoder is adapted to control said transmitter to transmit light pulses corresponding to said simulated flying projectile at a time before said predetermined reference time corresponding to the time needed for light to travel from said first player to said simulated flying projectile, and wherein said decoder is configured to calculate the distance from said second player to said simulated flying projectile by comparing the time of receipt of said light pulse and said predetermined reference time and utilizing the speed of light.

4. The system according to claim 1, wherein said encoder is configured to control said transmitter to transmit information through light pulses within certain reference time intervals having a given predetermined reference start time and configured to transmit information by selecting a time distance of the time of transmission of light pulses to said reference start time of such an interval.

5. The system according to claim 1, wherein said encoder is configured to control said transmitter to transmit said light pulses during intervals having predetermined reference times known by said first and second players, in which said interval is built up by at least two, a first and a second, predetermined reference times, wherein the transmitter is configured to transmit first and second light pulses at the predetermined reference times, and wherein said encoder is configured to select a time distance between said first and second light pulses as a carrier of information.

6. The system according to claim 5, wherein each said interval has a further third predetermined reference time located between said first and second predetermined reference times, wherein said encoder is configured to control the transmitter to transmit third light pulse at said third predetermined reference time and to use a time distance between the transmission of the third light pulse with respect to that of the first and the second light pulse for transmitting information.

7. The system according to claim 2, wherein said decoder is configured to establish the difference between the time of receipt of said first light pulse and said first predetermined reference time and utilize the speed of light for calculating the distance between said second player and said first player.

8. The system according to claim 3, wherein said encoder is configured to control said transmitter to transmit said light pulses during intervals having predetermined reference start times known by said first and second players, in which a said interval is built up by at least two, a first and a second, predetermined reference times, wherein said decoder is configured to calculate the distance between said second player and said flying projectile by comparing the time of receipt of said light pulse transmitted at a time before said predetermined reference time corresponding to the time needed for light to travel from said first player to said simulated flying projectile with said first predetermined reference time for calculating the distance between said second player and said flying projectile utilizing the speed of light.

9. The system according to claim 1, wherein said synchronizing unit is adapted to use a satellite-based navigating system.

10. The system according to claim 1, wherein said transmitter comprises a laser configured to emit laser pulses.

11. The system according to claim 1, wherein the encoder and the transmitter are arranged on the second player and the receiver and decoder are arranged on the second player.

12. A method for transmission of information between at least two players, said method comprising:
encoding light pulses;
transmitting information in the form of such coded light pulses from a first of said players towards at least one second of said players, wherein each player is provided with a clock;
receiving said light pulses by said second player;
decoding at said second player the information of the light pulses received, periodically synchronizing said clocks provided with each player;
wherein encoding the light pulses by controlling the transmission of the light pulses to take place at transmission times with a relation to predetermined reference times based on said clock at said first player, wherein said first player and said second player know said predetermined reference times; and
wherein decoding of the light pulses received is carried out by using information about a time of receipt of said light pulses and said predetermined reference times based on said clock provided with said second player.

13. The method according to claim 12, wherein said light pulses are transmitted at said predetermined reference times, and wherein the distance between said second player and said first player is calculated by establishing a difference between said time of receipt and a possible time of transmission equal to a known predetermined reference time and utilizing the speed of light.

14. The method according to claim 12, wherein during a flight time of a simulated flying projectile fired by the first player the distance from the first player to the simulated flying projectile is calculated, wherein said encoding takes place by controlling a transmission of light pulses corresponding to said simulated flying projectile at a time before said predetermined reference time corresponding to the time needed for light to travel from said first player to said simulated flying projectile, and wherein said decoding is carried out by calculating the distance from said second player to said simulated flying projectile by comparing the time of receipt of said light pulse and said predetermined reference time and utilizing the speed of light.

15. The method according to claim 12, wherein said encoding takes place by controlling said transmission of light pulses to take place within certain reference time intervals having a given predetermined reference start time and selecting a time distance of a time of transmission of light pulses to said predetermined reference start time of such an interval for transmitting information.

16. The method according to claim 12, wherein said encoding takes place by controlling said transmission of light pulses to take place during intervals having predetermined reference times known by said first and second players, in which said interval is built up by at least two, a first and a second, predetermined reference times, wherein first and second light pulses are transmitted at these predetermined reference times, and wherein said encoding takes place by selecting a time distance between said first and second light pulses as a carrier of information about for instance type of ammunition fired as a simulated flying projectile by said first player.

17. The method according to claim 16, wherein, each said interval having a further third predetermined reference time located between said first and second predetermined reference times, said encoding takes place by controlling transmission of a third light pulse at said third predetermined reference time, and wherein a time distance between the transmission of the third light pulse with respect to the first and second light pulse is used for transmitting information.

18. The method according to claim 16, wherein said decoding takes place by establishing the difference between the time of receipt of said first light pulse and said first predetermined reference time of said interval and utilizing the speed of light for calculating the distance between said second player and said first player.

19. The method according to claim 14, wherein said encoding takes place by controlling the transmitting of said light pulses during intervals having predetermined reference start times known by said first and second players, in which said intervals are built up by at least two, a first and a second, predetermined reference times, that said decoding takes place by calculating the distance between said second player and said flying projectile by comparing the time of receipt of said light pulse transmitted at a time before said predetermined reference time corresponding to the time needed for light to travel from said first player to said simulated flying projectile with said first predetermined reference time for calculating the distance between said second player and said flying projectile utilizing the speed of light.

20. A computer program on a non-transitory computer readable medium including computer program instructions recorded on the non-transitory computer readable medium and directly loadable into the internal memory of a digital computer, when executed by the digital computer, carry out a method for transmission of information between at least two players, the method comprising:
encoding light pulses;
transmitting information in the form of such coded light pulses from a first of said players towards at least one second of said players, wherein each player~is provided with a clock;

receiving said light pulses by said second player;

decoding at said second player the information of the light pulses received, periodically synchronizing maintaining synchronization of said clocks provided with each player;

wherein encoding the light pulses by controlling the transmission of the light pulses to take place at transmission times with a relation to predetermined reference times known by said first and second player based on said clock at said first player, wherein said first player and said second player know said predetermined reference times; and wherein decoding of the light pulses received is carried out by using information about a time of receipt of said light pulses and said predetermined reference times based on said clock provided with said second player.

* * * * *